US009673874B2

United States Patent
Patwardhan

(10) Patent No.: US 9,673,874 B2
(45) Date of Patent: Jun. 6, 2017

(54) SYSTEM AND METHOD FOR CONTROLLING SELECTION OF NETWORK DEVICES FOR BEAMFORMING

(71) Applicant: Aruba Networks, Inc., Sunnyvale, CA (US)

(72) Inventor: Gaurav Patwardhan, Sunnyvale, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/697,383

(22) Filed: Apr. 27, 2015

(65) Prior Publication Data

US 2016/0315672 A1   Oct. 27, 2016

(51) Int. Cl.
*H04B 7/04* (2006.01)
*H04B 7/024* (2017.01)
*H04B 7/06* (2006.01)
*H04W 16/28* (2009.01)

(52) U.S. Cl.
CPC ........... *H04B 7/024* (2013.01); *H04B 7/0617* (2013.01); *H04W 16/28* (2013.01)

(58) Field of Classification Search
CPC ........... H04B 7/0695; H04B 7/00; H04B 7/04
See application file for complete search history.

(56) References Cited

U.S. PATENT DOCUMENTS

| 2005/0047384 | A1* | 3/2005 | Wax | H04W 72/046 370/338 |
|---|---|---|---|---|
| 2010/0177717 | A1 | 7/2010 | Sung et al. | |
| 2010/0238851 | A1* | 9/2010 | Sundaresan | H04B 7/0695 370/312 |
| 2010/0309848 | A1* | 12/2010 | Erceg | H04L 5/0023 370/328 |
| 2012/0257664 | A1* | 10/2012 | Yue | H04B 7/0452 375/227 |

(Continued)

OTHER PUBLICATIONS

Local and Metropolitan Area Networks—Amendment 4: Enhancements; for Very High Throughput for Operation in Bands Below 6 GHz; Std 802.11 ac; Copyright © 2013 IEEE.

(Continued)

*Primary Examiner* — Jaison Joseph
(74) *Attorney, Agent, or Firm* — Hewlett Packard Enterprise Patent Department

(57) ABSTRACT

According to one embodiment of the invention, a network device comprises a plurality of antenna elements, one or more hardware processors, and a memory communicatively coupled to the one or more hardware processors. The memory comprises selective beamforming grouping logic that, upon execution by the one or more processors, aggregates a plurality of beamforming-enabled client devices within a coverage area of the network device. Furthermore, the selective beamforming grouping logic further categorizes the plurality of beamforming-enabled client devices into a plurality of groups based on a data transfer rate level supported by each of the plurality of beamforming-enabled client devices, determines a subset of client devices within a first group of the plurality of groups associated with a lowest data transfer rate level, and applies transmit beamforming simultaneously or at least concurrently for each client device of the subset of client devices.

18 Claims, 10 Drawing Sheets

(56) References Cited

U.S. PATENT DOCUMENTS

| | | |
|---|---|---|
| 2013/0286959 A1 | 10/2013 | Lou et al. |
| 2014/0146736 A1 | 5/2014 | Kim et al. |
| 2014/0185564 A1 | 7/2014 | Dong et al. |
| 2014/0226599 A1 | 8/2014 | Xia et al. |
| 2014/0269370 A1* | 9/2014 | Dharanipragada ... H04W 24/02 370/252 |
| 2015/0016379 A1* | 1/2015 | Nam .................... H04B 7/0456 370/329 |
| 2015/0326340 A1* | 11/2015 | Huang ................. H04B 7/0413 375/267 |

OTHER PUBLICATIONS

PCT International Search Report; cited in Appl. No. PCT/US2016/029616; mailed Aug. 24, 2016; 3 pages.

\* cited by examiner

SYSTEM AND METHOD FOR CONTROLLING SELECTION OF NETWORK DEVICES FOR BEAMFORMING

FIELD

Embodiments of the disclosure relate to the field of networking. More specifically, embodiments of the disclosure relate to a system and computerized method that controls the selection of network devices to which beamforming is applied in order to enhance overall performance of a wireless network.

GENERAL BACKGROUND

Over the last decade or so, electronic devices responsible for establishing and maintaining wireless connectivity within a wireless network have increased in complexity. For instance, wireless electronic devices now support greater processing speeds and greater data rates. As a by-product of this increased complexity, radio communications techniques have evolved with the emergence of multiple-input and multiple-output (MIMO) radio architectures.

In general, MIMO involves the use of multiple antennas operating simultaneously as transmitters and/or receivers to improve communication performance. In comparison with other radio architectures, MIMO can offer significant increases in data throughput and link reliability. However, overall system throughput for a network still is adversely affected by wireless network (client) devices operating at low data transfer rates. More specifically, the wireless data transfer rate, sometimes referred to as "modulation and coding scheme (MCS) rate," for client devices operating within a wireless network may greatly influence the overall system throughput because a client device operating at a lower MCS rate requires a greater amount of airtime to transmit a prescribed wireless packet than a client device operating at a higher MCS rate. This greater amount of requisite overall airtime translates into a lesser amount of data that can be transmitted over the wireless network.

The Institute of Electrical and Electronics Engineers (IEEE) standard entitled "Enhancements for Very High Throughput WLANs" (hereinafter "the IEEE 802.11ac standard") introduces a beamforming scheme, which allows an access point (AP) to send data to a client device at a higher MCS rate by forming wireless "beam" signals toward the client device. This is accomplished by applying different amplitude and phase shifts between the antenna elements of the AP. According to the IEEE 802.11ac standard, beamforming may be conducted in accordance with single-user MIMO (SU-MIMO) or multi-user MIMO (MU-MIMO). For SU-MIMO, the beamforming involves the transmission of wireless signals from multiple antennas towards a single client device during a single time frame. For MU-MIMO, however, the beamforming involves altering the amplitude and phase shifts for transmitting wireless signals simultaneously to multiple client devices in a single time frame. To achieve the highest system throughput, both SU-MIMO and MU-MIMO communications need to be optimized.

Currently, some APs that are MU-MIMO enabled are configured to select, on a first-come, first-served basis, beamforming-capable client devices as they associate to the AP. However, the selection of client devices for beamforming on a first-come, first-served basis is inefficient as this selection scheme does not target those client devices that, upon achieving an increased MCS rate, would provide greater improvement to overall network throughput.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1A:
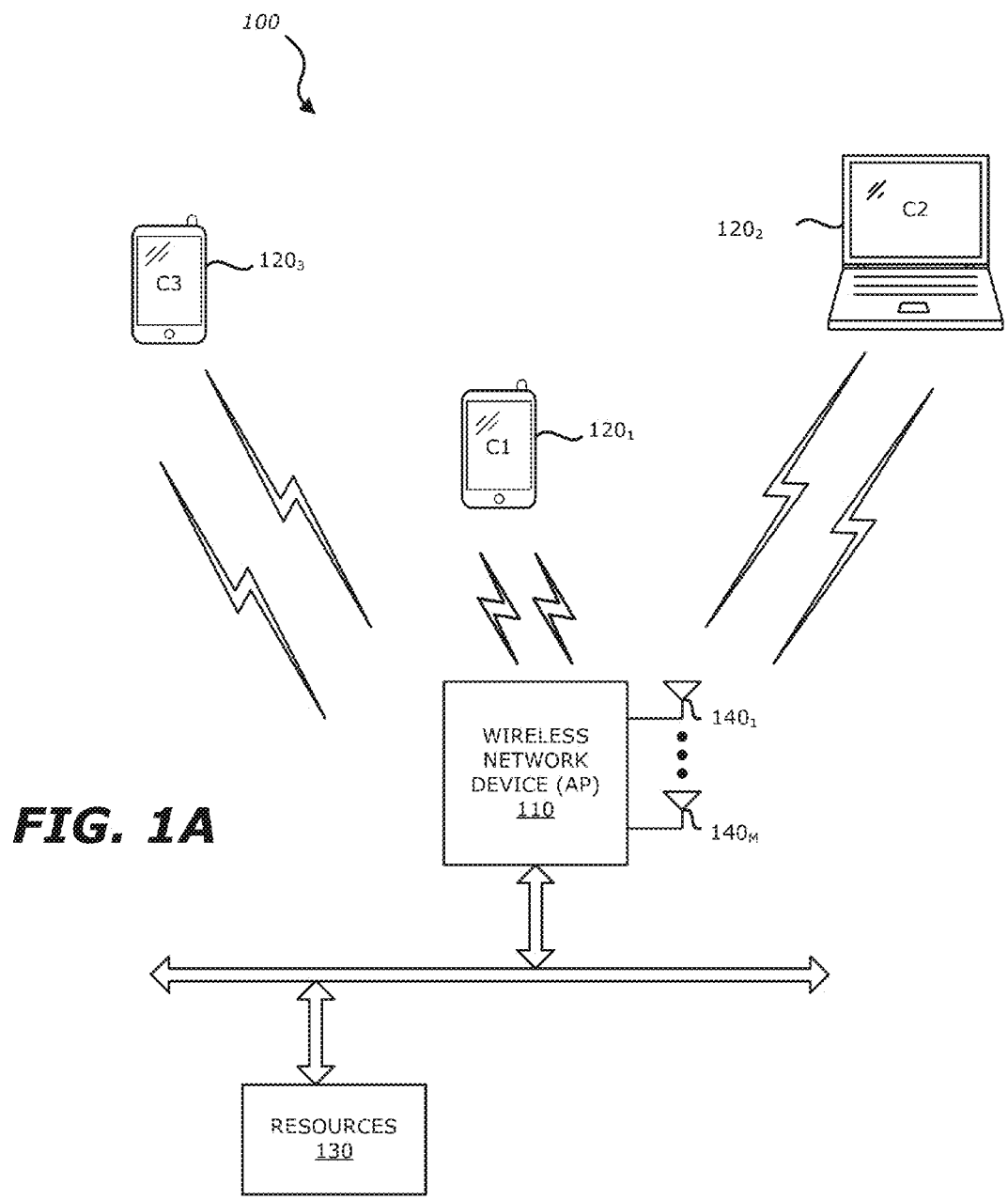
FIG. 1A is an exemplary block diagram of a wireless network with a wireless network device 110 that supports a selective beamforming grouping scheme.

Various embodiments of the disclosure relate to a system and computerized method that controls the selection of network devices to which beamforming is applied in order to enhance performance of a wireless network (hereinafter referred to as a "selective beamforming grouping scheme"). The selective beamforming grouping scheme comprises (1) a device aggregation scheme, which identifies the client devices to which beamforming may be conducted, followed by (2) a device selection scheme, which selects a subset of client devices that, upon undergoing beamforming, improves in efforts to optimize overall throughout of the wireless network. The selective beamforming grouping scheme is performed on information (e.g., identifiers such as IP addresses, MAC addresses, or serial numbers; and/or wireless data transfer rate levels) that is received by an access point (AP) during an association phase or other types of communications for use in selecting an ordering of client device beamforming.

In accordance with one embodiment of the disclosure, responsive to a prescribed triggering event, an access point (AP) performs a device aggregation scheme on client devices that are associated with the AP. The device aggregation scheme involves (i) a determination as to which client devices associated with the AP are beamforming-enabled, or in the alternative, (ii) a determination as to which of these client devices are beamforming-enabled and support MU-MIMO functionality. The device aggregation scheme gathers information (e.g., unique identifiers) associated with a first grouping of client devices, where the information associated with the first grouping of client devices is organized based on one or more factors, such as wireless data transfer rate levels (e.g., modulation and coding "MCS" rate) with respect to wireless transmissions to a particular client device from the AP.

After the device aggregation scheme has been conducted, when the first grouping of client devices is MU-MIMO enabled, the AP performs a device selection scheme for grouping client devices that may collectively undergo beamforming. More specifically, according to one embodiment of the device selection scheme, the AP further categorizes information (e.g., identifiers) associated with the client devices from the first grouping into a second grouping that features one or more sub-groups (hereinafter "groups"). This information is further categorized based on a selected parameter, such as categorizing the client devices based on the highest wireless data transfer rate that each client device can support.

As an illustrative embodiment, according to one embodiment of the disclosure, identifiers associated with one or more client devices that reliably support a first data transfer rate level (e.g., MCS index 0, or MCS indices 0&1, etc.) associated with wireless transmissions from the AP may be assigned to a first group. Additionally, identifiers associated with one or more client devices that reliably support a second data transfer rate level (e.g., MCS index 1, or MCS indices 2&3, etc.) associated with wireless transmissions from the AP may be assigned to a second group, and so on. The granularity of the number of groups may be based, at least in part, on the number of MCS rates supported by the selected transmission protocol (e.g., AP operating in accordance with the IEEE 802.11ac standard supports ten (10) different data transfer rates identified as MCS index 0-9).

Thereafter, starting with the first group, namely identifiers associated with the group of client devices that support the lowest data transfer rate level, the AP determines a subset of these client devices which, when undergoing (MU-MIMO) beamforming, ensures complete usage of the spatial stream capacity available for each wireless message transmission. This determination may involve applying a combinatorial optimization scheme (e.g., knapsack problem optimization), which applies different weightings to various characteristics for each client device, including spatial stream capacity, for determining a rating for each client device that is used to select the subset of client devices. For instance, as an illustrative example, the top "j" (e.g., j=4) client devices with the highest ratings and that collectively occupy the entire spatial stream capacity of the AP are selected as the subset of client devices.

Upon determining the subset of client devices, the AP applies transmit beamforming simultaneously or at least concurrently (i.e. overlapping at least in part in time) to these client devices, and thereafter, removes identifiers associated with these client devices from the first group. The device selection scheme is iterative, provided the first group features at least one client device and the spatial stream capacity of the client device(s) is at least equal to the spatial stream capacity of the AP. If not, the client devices in the first group are added to the next (second) group and the device selection scheme continues until the AP has conducted beamforming on the determined subset of client devices.

In the event that a triggering event occurs prior to completion of the device selection scheme, it is contemplated that the device selection scheme may be allowed to complete or the device aggregation scheme may restart and subsequent categorization of beamforming-enabled client devices is conducted for performance of a subsequent device selection scheme.

Hereinafter, for ease in understanding, the "grouping" and "categorizing" operations within the selective beamforming grouping scheme may be described in relation to the client devices. It is recognized, however, that these operations are directed to the grouping and classifying of information associated with these devices, and are not to the grouping of the physical client devices themselves.

I. TERMINOLOGY

In the following description, certain terminology is used to describe aspects of the invention. For example, in certain situations, terms "logic" and "component" are representative of hardware, firmware and/or software that is configured to perform one or more functions. As hardware, logic (or component) may include circuitry having data processing or storage functionality. Examples of such processing or storage circuitry may include, but is not limited or restricted to a processor; one or more processor cores; a programmable gate array; a microcontroller; an application specific integrated circuit; receiver, transmitter and/or transceiver circuitry; semiconductor memory; or combinatorial logic, or combinations of one or more of the above components.

Logic (or component) may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of a "non-transitory storage medium" may include, but are not limited or restricted to a programmable circuit; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device; and/or a semiconductor memory. As firmware, the executable code is stored in persistent storage.

The term "network device" generally represents electronic equipment that supports wireless communications, which may include an access point (AP) and/or a client device. The term "AP" generally refers any data transfer device with wireless connectivity that monitors and controls the propagation of wireless signaling to one or more client devices. The term "client device" generally refers to a portable consumer product with wireless connectivity (e.g., cellular phone, laptop, tablet, etc.) or a stationary consumer product with wireless connectivity (e.g., desktop computer, television, video game controller, set-top box, etc.).

A "wireless message" generally refers to information transmitted over the air in a prescribed format, where each message may be in the form of one or more packets or frames, or any other series of bits having the prescribed format.

The term "transmission medium" is a physical or logical communication path with an endpoint device. For instance, the communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. GENERAL NETWORK ARCHITECTURES

Referring to FIG. 1A, an exemplary block diagram of a wireless network 100 with a wireless network device 110 that supports a selective beamforming grouping scheme is shown. Herein, the wireless network device 110 is a data transfer device with wireless connectivity that "associates" with one or more client devices $120_1$-$120_P$ (P≥1, P=3 for example) to monitor and control the exchange of wireless messages with the client device(s) $120_1$-$120_3$. An example of wireless network device 110 is an access point (AP) that provides connectivity between resources 130 (e.g., one or more servers, network controllers, etc.) and the client devices $120_1$-$120_3$.

More specifically, the AP 110 comprises a plurality of antenna elements $140_1$-$140_M$ (e.g., radio control circuitry and antennas) that support SU-MIMO and MU-MIMO wireless signal transmission schemes. When operating in accordance with SU-MIMO, the AP 110 may simultaneously (or at least concurrently) transmit the same wireless message through multiple antenna elements $140_1$-$140_M$ to a targeted client device, which also may be adapted with multiple antenna elements (e.g., client device $120_2$). The multiple propagation paths for the transmitted wireless message may improve throughput and reliability for the wireless network 100. During SU-MIMO, when beamforming is further enabled in efforts to achieve a higher MCS rate (referred to as "single user beamforming"), the antenna elements $140_1$-$140_M$ of the AP 110 undergo amplitude and phase shifting to alter the propagation paths for the same wireless message transmitted from AP to the client $120_2$. The beamforming (and adjustment of the amplitude and phase shifting) may be conducted sequentially for all remaining beamforming-enabled client devices (e.g., client $120_3$).

Differently, when operating in accordance with MU-MIMO, the antenna elements $140_1$-$140_M$ of the AP 110 undergo amplitude and phase shifting so that (1) particular wireless messages are transmitted concurrently from the antenna elements $140_1$-$140_M$ to multiple client devices (e.g., client devices $120_1$ and $120_3$) and (2) inter-client destructive interference is reduced, which increases SNR realized by the multiple client devices and effectively increases signal throughput.

Figure 1B:
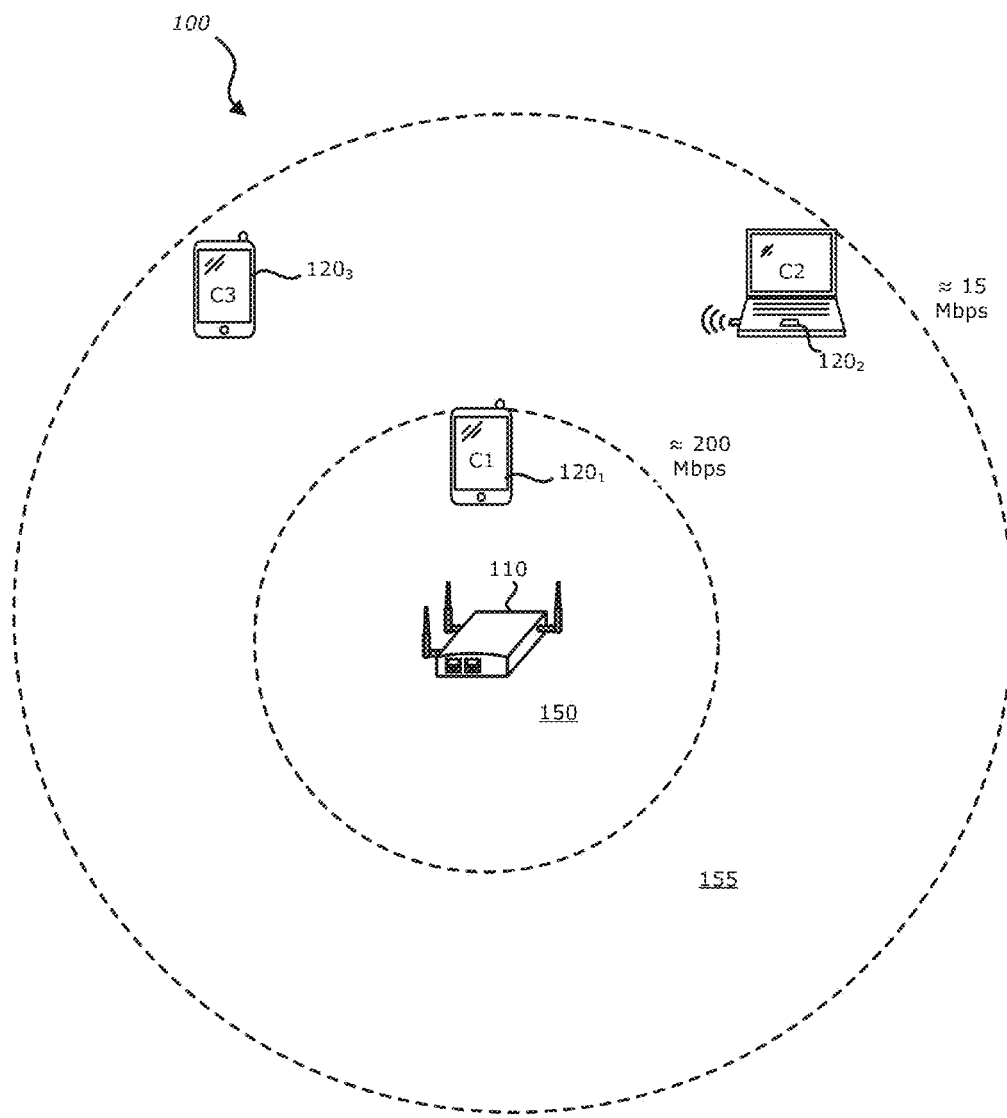
FIG. 1B is an illustrative embodiment of a signal coverage areas with client devices having a different MCS rates.
Figure 1C:
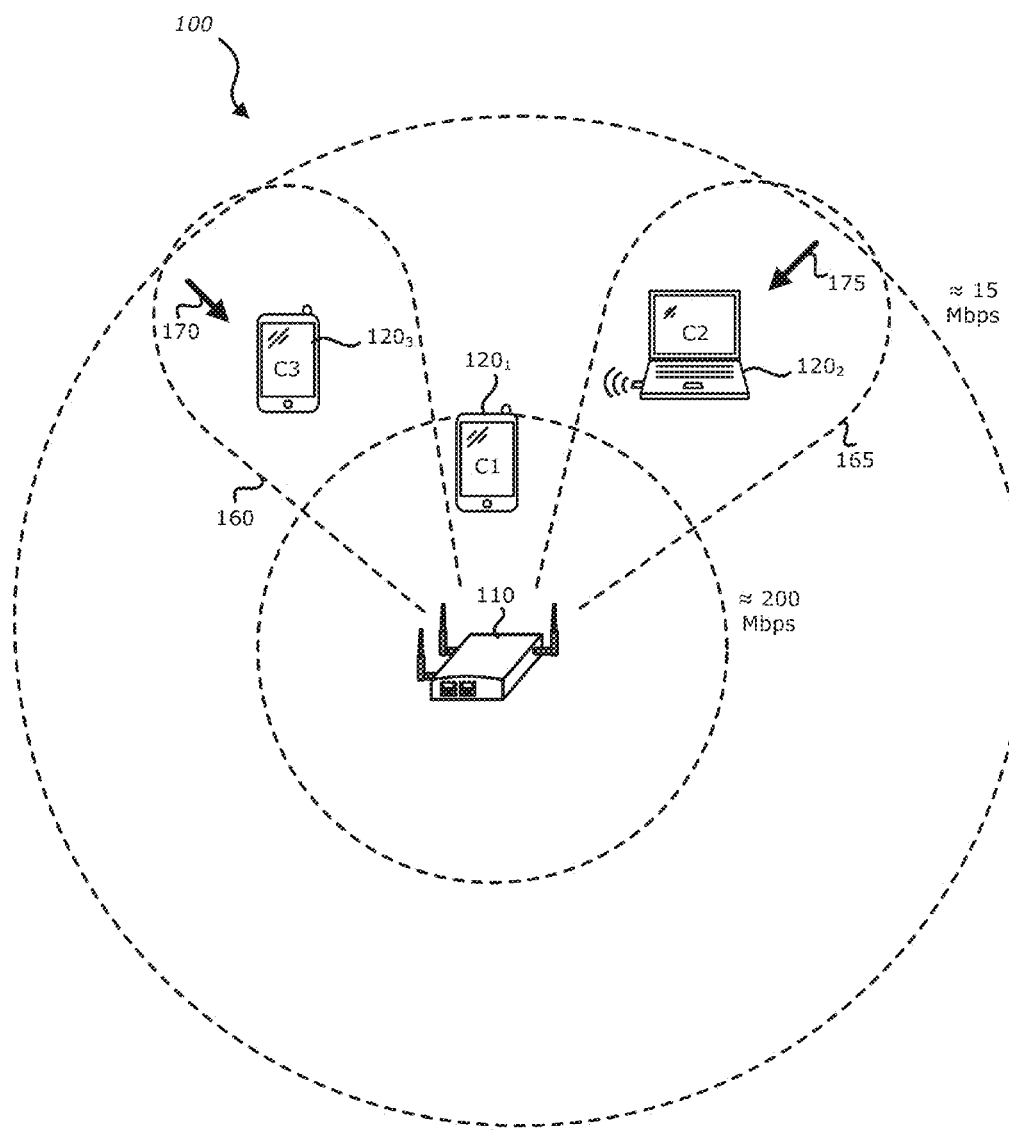
FIG. 1C is an illustrative embodiment of a signal coverage areas with client devices having a different MCS rates after conducting selective beamforming.

Referring now to FIGS. 1B and 1C, illustrative embodiments of signal coverage areas 150 and 155 of the AP 110, which identifies client device $120_1$ that is beamforming-enabled and having a MCS rate greater than beamforming-enabled client device $120_2$. Herein, as shown in FIG. 1B, prior to conducting selective beamforming grouping, a first client device $120_1$ supports a first data transfer rate (e.g., MCS index 9 at approximately 200 megabits per second (Mbps)), which exceeds a second data transfer rate (e.g., MCS index 0 at approximately 15 Mbps) supported by the second client device $120_2$ and the third client devices $120_3$. After conducting the selective beamforming grouping scheme (described below), as shown in FIG. 1C, the first client device $120_1$ still supports the first data transfer rate (e.g., MCS index 9). However, based on beamforming conducted on the second and third client devices $120_2$ and $120_3$, as represented by beamforming patterns 160 and 165, the MCS rates for the second and third client devices $120_2$ and $120_3$ are increased as denoted by arrows 170 and 175 to a third data transfer rate (e.g., MCS index 1) based on an increased SNR.

Figure 1D:
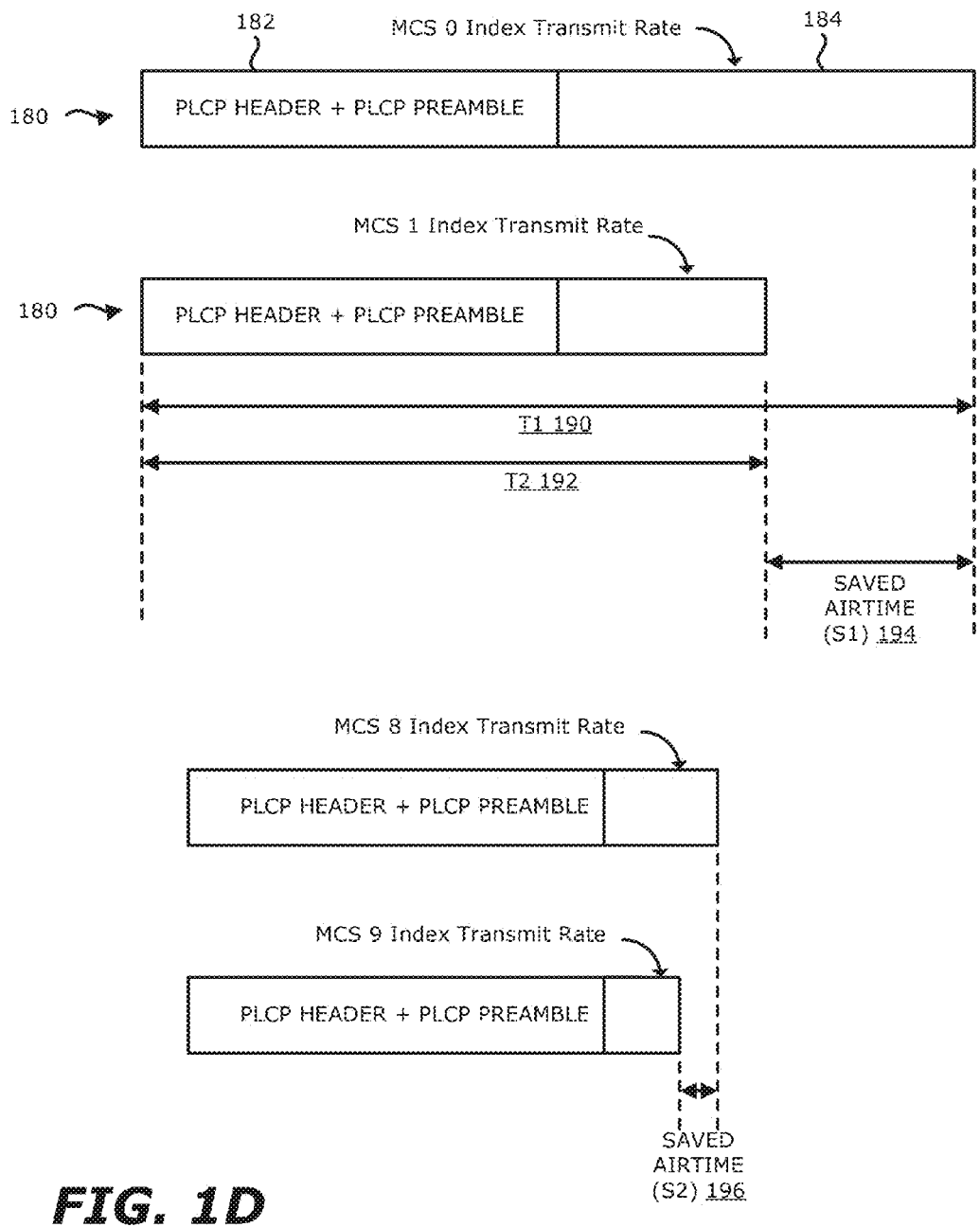
FIG. 1D is an illustrative example of airtime savings realized in response to performance of the selective beamforming grouping scheme.

Referring now to FIG. 1D, an illustrative example of airtime savings realized in response to performance of the selective beamforming grouping scheme is shown. The amount of airtime savings when adjusting a beamforming-enabled client device operating at a first MCS rate (e.g., MCS index 0) to now operate at a second MCS rate (e.g., MCS index 1) is substantially greater than adjusting a beamforming-enabled client device to operate at MCS index 9 instead of MCS index 8. Herein, the AP 110 transmits a first message 180, which comprises a header portion 182 and a payload portion 184, to the second (beamforming-enabled) client device $120_2$. The prescribed transmit time from the AP 110 to the second client device $120_2$ operating at MCS index 0 is a first time period T1 190. However, when altered to operate at MCS index 1, the transmit time for the first message 180 from the AP 110 to the second client device $120_2$ is equal to a second time period T2 192, which is less than the first time period T1 190. The total time savings (S1) 194, namely the difference between the first time period (T1) 190 and the second time period (T2) 192, is substantially greater than the total time savings (S2) 196 realized by conducting beamforming so that the first device $120_1$ now is operating at MCS index 9 instead of MCS index 8.

Figure 2:
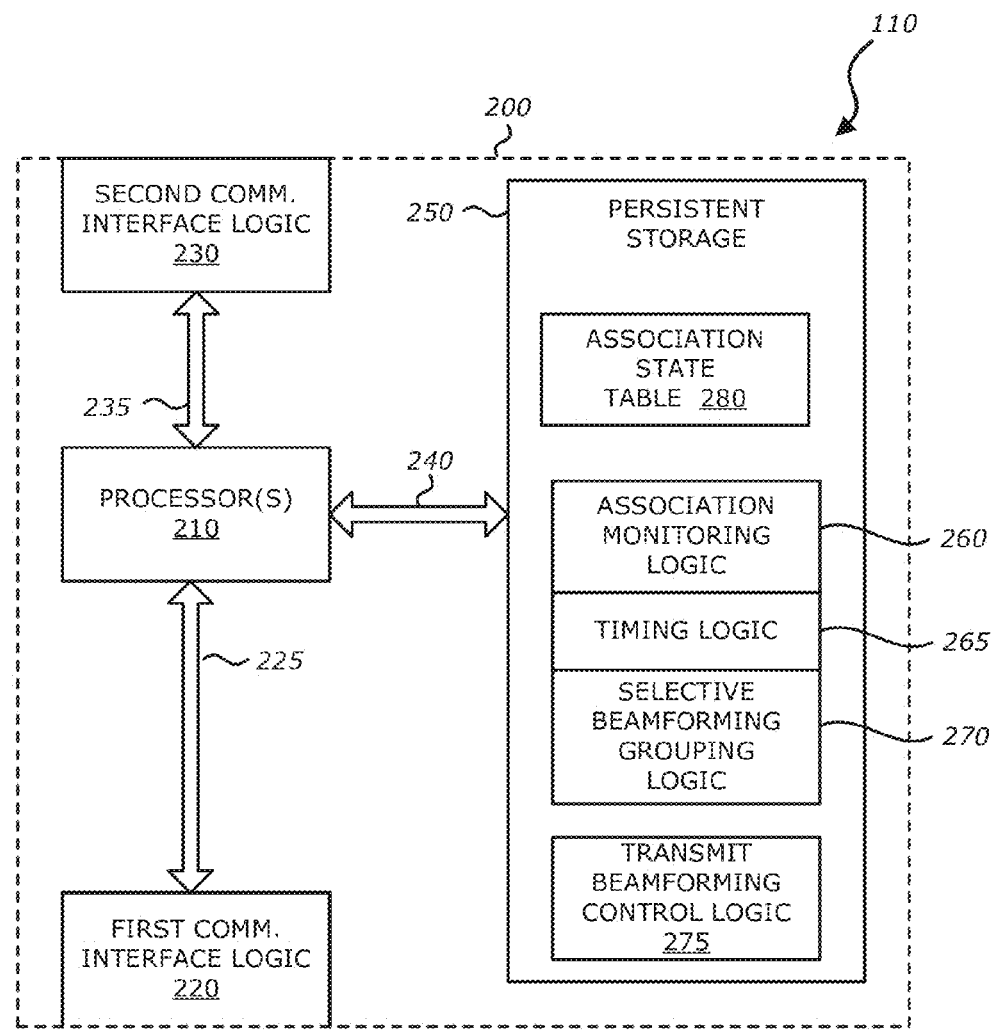
FIG. 2 is a logical representation of logic forming the AP of FIGS. 1A-1C.

Referring now to FIG. 2, a logical representation of logic forming the AP 110 is shown. Herein, the AP 110 comprises a housing 200, which is made entirely or partially of a hardened material (e.g., hardened plastic, metal, glass, composite or any combination thereof) that protects circuitry within the housing 200, namely one or more processors 210 that are coupled the coupled to a first communication interface logic 220 via a first transmission medium 225 and a second communication interface logic 230 via a second transmission medium 235. According to one embodiment of the disclosure, the first communication interface logic 220 may be implemented as the plurality of antenna elements $140_1$-$140_M$, which enable wireless communications with physically distant network devices. Additionally, the second communication interface logic 230 may be implemented as a physical interface including one or more ports for wired connectors.

Processor(s) 210 is further coupled to persistent storage 250 via transmission medium 240. According to one embodiment of the disclosure, persistent storage 250 may include (a) association monitoring logic 260; (b) timing logic 265; and (c) selective beamforming grouping logic 270. Of course, when implemented as hardware, one or more of these logic units could be implemented separately from each other.

Collectively, association monitoring logic 260 and the timing logic 265 monitor for triggering events that cause activation of the selective beamforming grouping logic 270, described below. For instance, the association monitoring logic 260 monitors for changes in an association state table 280, which maintains unique identifiers of the network devices that are associated with the AP 110. In response to a change in the association state table 280, the association monitoring logic 260 causes activation of the selective beamforming grouping logic 270, which selects a subset of network (client) devices that are subject to simultaneous (or at least concurrently) transmit beamforming for better overall system throughput, as described below. A change in the association state table 280 may constitute an event (addition) where a new client device "associates" with the AP 110 and/or an event (deletion) where an existing client device disassociates from the AP 110.

The timing logic 265 sets a prescribed time period for activation and re-activation of the selective beamforming grouping logic 270. In contrast to the association monitoring logic 260, which is generally interrupt-driven, the timing logic 265 is based on one or more prescribed scheduled tasks. The timing logic 265 ensures that the selective beamforming grouping logic 270 is periodically or even aperiodically activated despite the client devices remaining associated with the AP 110. The reason is that many types of client devices are mobile, and thus, at certain time, the MCS rates of the client devices may vary enough such that a different subset of client devices would be selected for beamforming.

The selective beamforming grouping logic 270 is responsible for establishing a subset of beamforming-enabled client devices that would provide substantial, and perhaps an optimal, increase in overall throughput of the wireless network 100 of FIG. 1A. Transmit beamforming control logic 275 conducts transmit beamforming for the client devices chosen by the selective beamforming grouping logic. The operations of the selective beamforming grouping logic 270 are described below in FIG. 3.

III. CLIENT DEVICE SELECTION SCHEME FOR BEAMFORMING

Figure 3:
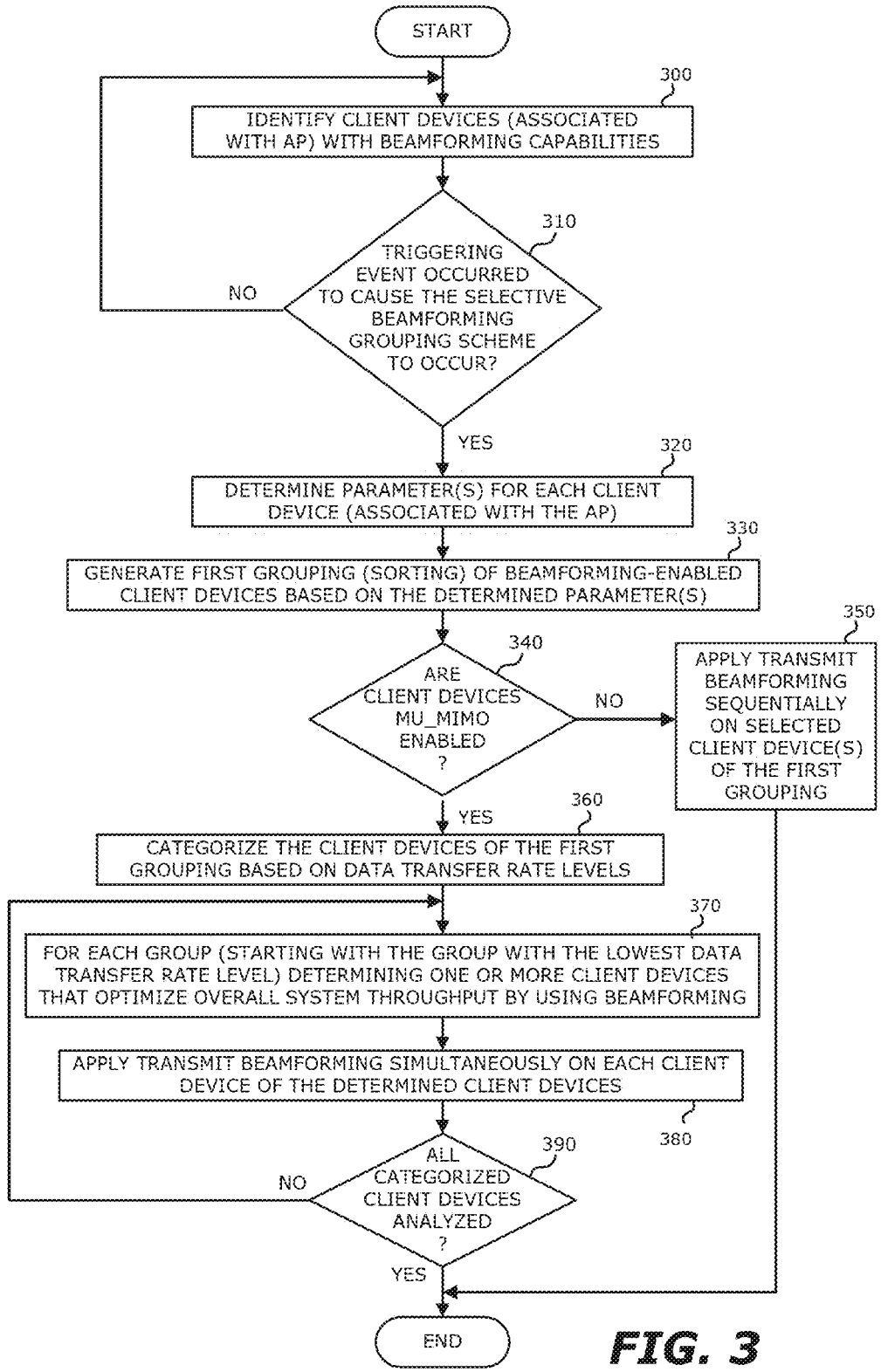
FIG. 3 is an illustrative embodiment of the operations conducted by the AP of FIGS. 1A-1C in accordance with a selective beamforming grouping scheme.

Referring to FIG. 3, an illustrative embodiment of the operations conducted by the AP 110 in accordance with a selective beamforming grouping scheme, which is adapted to achieve higher beamforming throughput for the wireless network 100 of FIG. 1A is shown. Herein, the AP maintains an association table, which includes a listing of client devices that are associated with the AP. Of these client devices, a determination is made as to which of these client devices is beamforming-enabled, namely client devices that support beamforming functionality (block 300). In the alternative, although not shown, the determination may further identify, of the beamforming-enabled client devices, which of these client devices supports MU-MIMO. Thereafter, a determination is made as to whether a triggering event has occurred to cause the AP to conduct a device aggregation scheme on client devices that are associated with the AP (block 310).

Figure 4:
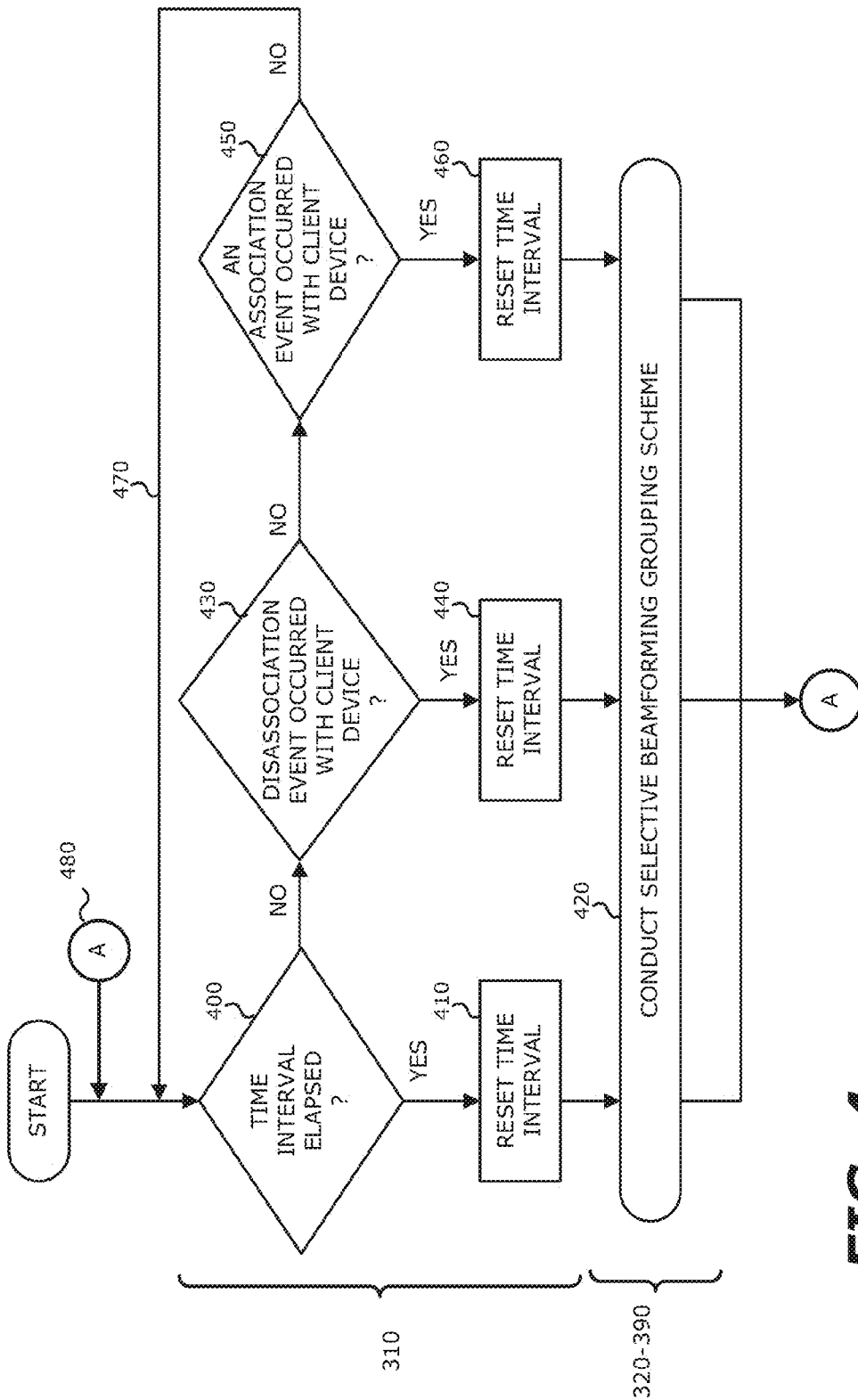
FIG. 4 is an exemplary embodiment of the triggering events for the selective beamforming grouping scheme of FIG. 3.

Referring now to FIG. 4, an exemplary embodiment of the triggering events for the selective beamforming grouping scheme of FIG. 3 is shown. Herein, a first triggering event occurs in response to the timing logic 265 of FIG. 3 detecting that a prescribed time period having elapsed since a prior selective beamforming grouping scheme was conducted (operation 400). If so, the selective beamforming grouping scheme commences (under control by selective beamforming grouping logic 270 of FIG. 2), and the prescribed time period may be reset prior to, during or after completion of the device aggregation scheme and/or the device selection scheme of the selective beamforming grouping scheme (operations 410 and 420).

Herein, if the first triggering event has not occurred due to an elapsed period of time between successive selective beamforming grouping operations, a determination is made as to whether a second triggering event has occurred, namely a new client device has associated with the AP (operation 430). If so, the prescribed time period may be reset while performing or after completion of the device aggregation scheme of the selective beamforming grouping scheme (operations 440 and 420). Similarly, if neither the first triggering event nor the second triggering event has occurred, a determination is made as to whether a third triggering event has occurred, namely has an existing client device disassociated from the AP (operation 450). If so, the prescribed time period may be reset while performing or after completion of the device aggregation scheme of the selective beamforming grouping scheme (operations 460 and 420).

In the event that none of the triggering events has occurred, the timing logic 265 and/or the association monitoring logic 260 continues the above-described analysis as represented by operation 470. In the event that one of the triggering events are detected, the triggering events may be monitored concurrently with the selective beamforming grouping operations as represented by operation 480.

Referring back to FIG. 3, in response to detecting a triggering event and commencing the selective beamforming grouping scheme, the AP performs a device aggregation scheme, which involves a determination as to one or more parameters for each of the client devices associated with the AP that are beamforming-enabled, or in the alternative, beamforming-enabled and support MU-MIMO functionality (operation 320). An example of a parameter may include, but is not limited or restricted to the current wireless data transfer rate (e.g., MCS rate) for wireless transmissions to that particular client device from the AP; signal-to-noise ratio (SNR) experienced by the particular client device and reported to the AP; received signal strength indication (RSSI) experienced by the particular client device and reported to the AP; or the like.

The device aggregation scheme further produces a first grouping of client devices, which is organized based on the one or more parameters (block 330). For instance, according to one embodiment of the disclosure, the client devices may be organized according to data transfer rate (e.g., MCS rate) reliably supported by each client device. Hence, client devices with MCS index 0 rates are aggregated and followed by client devices operating in accordance with MCS index 1, which are aggregated and followed by client devices operating in accordance with MCS index 2, and the like. Of course, other parameters may be used to further order client devices that are associated with the same subgroup (e.g., MCS index 0), such as spatial stream capacity and/or device type in order to concentrate MIMO functionality on selected devices that may have higher importance or usage.

If the client devices are not MU-MIMO enabled, the AP applies transmit beamforming sequentially on selected client devices within the first grouping (operations 340 and 350), as certain logic may feature beamforming restrictions as to the number of client devices supported. However, if the client devices are MU-MIMO enabled, the client devices from the first grouping are further categorized into a second grouping based on data transfer rate (operations 340 and 360). For instance, the categorization may involve classifying client devices based on the highest data transfer rate (e.g., MCS rate) that each client device can support.

As an illustrative embodiment of the second grouping, according to one embodiment of the disclosure, one or more client devices that support a first data transfer rate level (e.g., MCS index 0, or MCS indices 0&1, etc.) associated with wireless transmissions from the AP may be assigned to a first group. Similarly, one or more client devices that reliably support a second data transfer rate level (e.g., MCS index 1, or MCS indices 2&3, etc.) associated with wireless transmissions from the AP may be assigned to a second group. Any other groups may be populated with client devices in the same manner. The granularity of the number of groups may be based, at least in part, on the range in the data transfer rates (e.g., the number of MCS rates supported by the AP), the number of client devices that are associated with the AP, or the like.

It is contemplated that, as many of the client devices may be mobile, movement of these client devices may alter their data transfer rates. As a result, these determined groups of client devices may updated in response to each triggering event.

Thereafter, the AP determines which subset of client devices, which are part of a particular group such as the first group for example, are to undergo beamforming to ensure complete usage of the spatial stream capacity for each wireless (packet) transmission (operation 370). This determination may involve applying a combinatorial optimization scheme (e.g., knapsack problem optimization) which applies a weighting of the client devices, including spatial stream capacity, for determining the subset of client devices.

Upon determining the subset of client devices, the AP applies transmit beamforming simultaneously (or at least concurrently) to the subset of client devices and removes the subset of client devices from the first group (operation 380). The device selection scheme is iterative (operation 390), and continues for any group provided that group features at least one client device and the spatial stream capacity of the client device(s) is at least equal to the spatial stream capacity of the AP. If not, the client device(s) in the first group are added to the next (second) group and the device selection scheme continues until the AP has conducted beamforming on the total subset of client devices.

In the event that a triggering event occurs prior to completion of the device selection scheme, it is contemplated that this scheme may be allowed to complete or the device aggregation scheme may restart and subsequent categorization of beamforming-enabled client devices is conducted in performance of a subsequent device selection scheme.

Figure 5A:
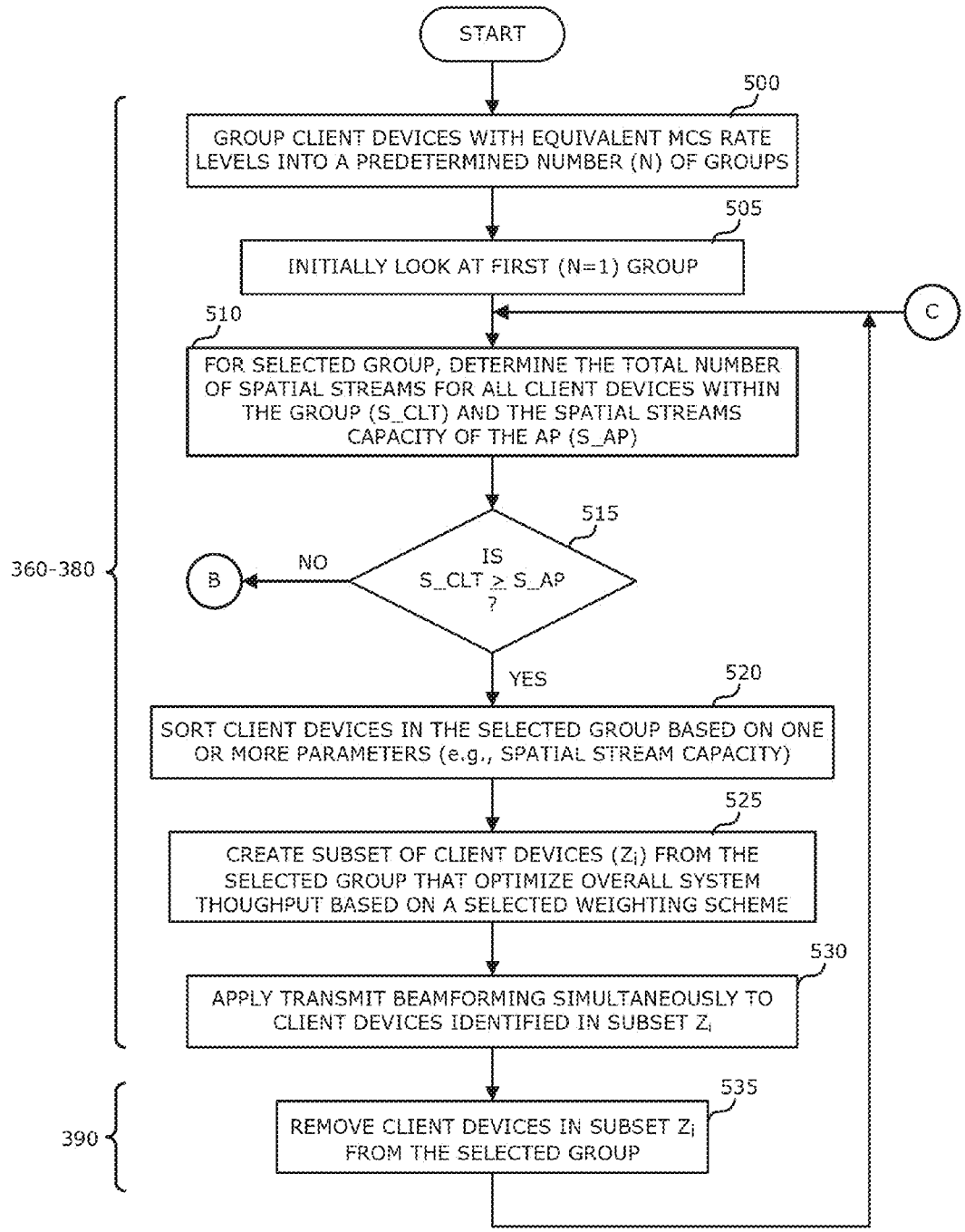
FIGS. 5A-5B are an exemplary embodiment of the device selection scheme of FIG. 3.
Figure 5B:
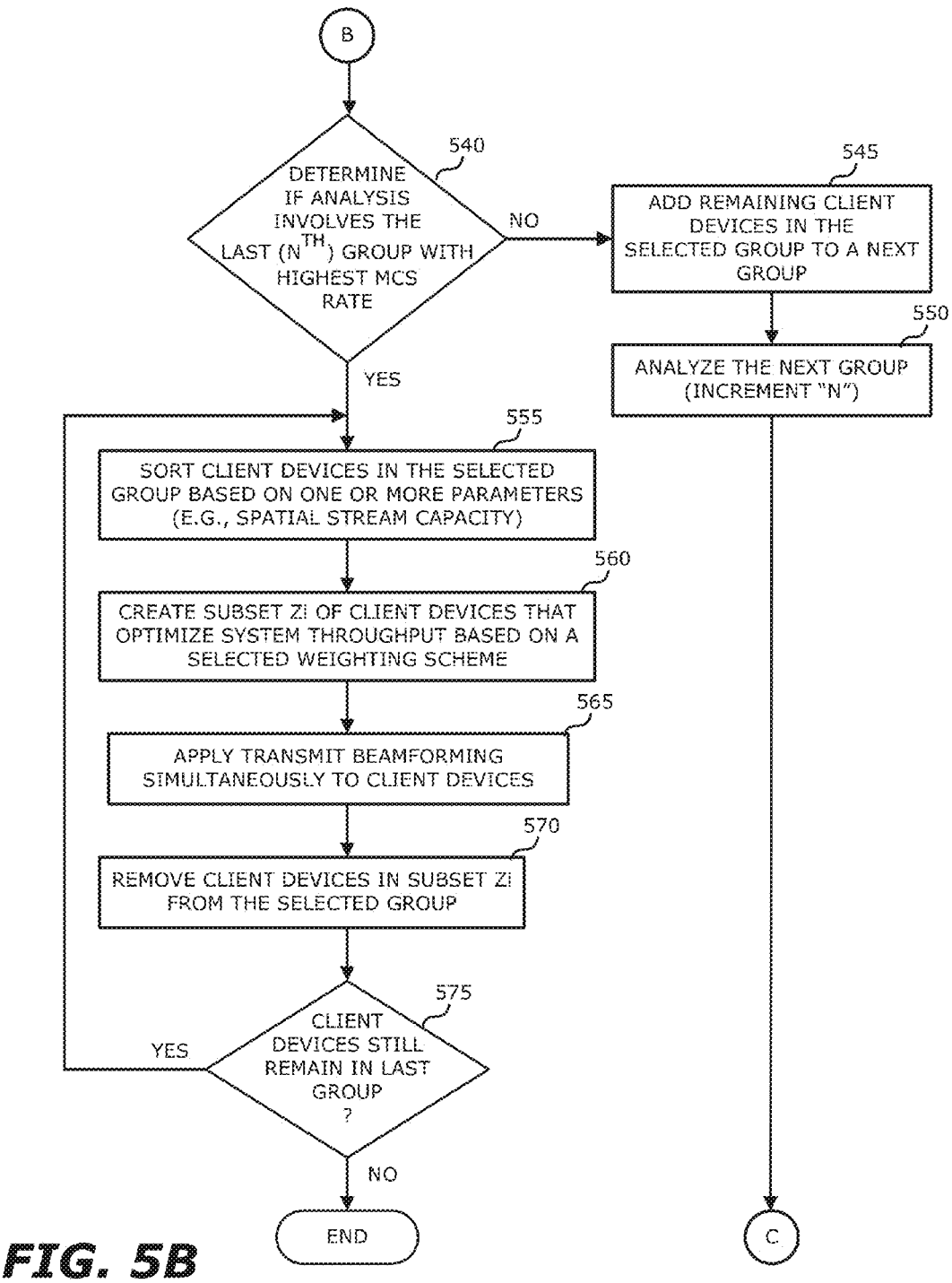

Referring now to FIGS. 5A-5B, a more detailed illustrative embodiment of the device selection scheme of FIG. 3 is shown. Herein, according to one embodiment of the disclosure, client devices are grouped with equivalent MCS rate levels into a predetermined number of groups (operation 500). Upon review of a first group having the lowest MCS rate level, a determination is made whether the total number of spatial streams for all client devices with the first group, which is represented by the term "S_CLT," is greater than or equal to the spatial stream capacity of the AP, which is represented by the term "S_AP" (operations 505 and 510).

When S_CLT is greater than or equal to S_AP, the client devices in that selected group are sorted based on one or more parameters (operations 515 and 520). One of these parameters may include spatial stream capacity, namely the number of spatial streams supported by the client device. Another one of these parameters may include the MCS rate for the client device, which would be utilized to prioritize client devices residing within the group when client devices with multiple MCS rates are contained within that group.

Thereafter, a subset of the client devices within the selected group is selected, where the client devices are selected to achieve a larger degree of improvement in efforts to optimize the overall system throughout through the use of beamforming (operation 530). The subset of client devices may be selected based on combinatorial optimization scheme (e.g., knapsack problem optimization) which applies weightings to different characteristics of the client devices for determining which client devices are selected as part of the subset of client devices (e.g., client devices with the highest total weighted value with the total number of spatial streams equal to the spatial capacity of the AP). For instance, a first weighting may correspond to the spatial stream capacity supported by the client device, where higher weightings are assigned to client devices that support more than one spatial stream or an aggregated weighting dependent on the number of spatial streams supported by the client device. As another illustrative example, a second weighting may be applied dependent on the total number of spatial streams for all client devices remaining within the selected group.

Thereafter, transmit beamforming is applied simultaneously (or at least concurrently) to the subset of client devices (subset $Z_i$, i=1), as illustrated in operation 530. After transmit beamforming is applied to the subset of client devices ($Z_1$) during transmission of messages, these client devices are removed from the first group and device selection scheme is iteratively conducted (subset $Z_i$, i=2 . . . ) while the number of spatial streams for all clients within this group (S_CLT) is greater than or equal to the spatial stream capacity for the AP (S_AP).

Figure 6A:
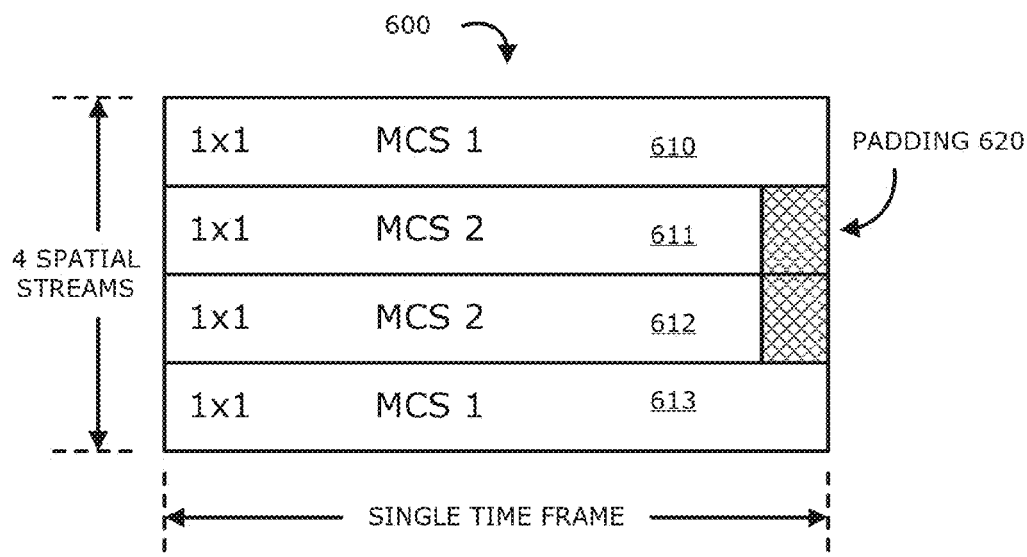
FIG. 6A is an illustrative example of a logical structure of a message (packet) transmission using the selective beamforming grouping scheme.
Figure 6B:
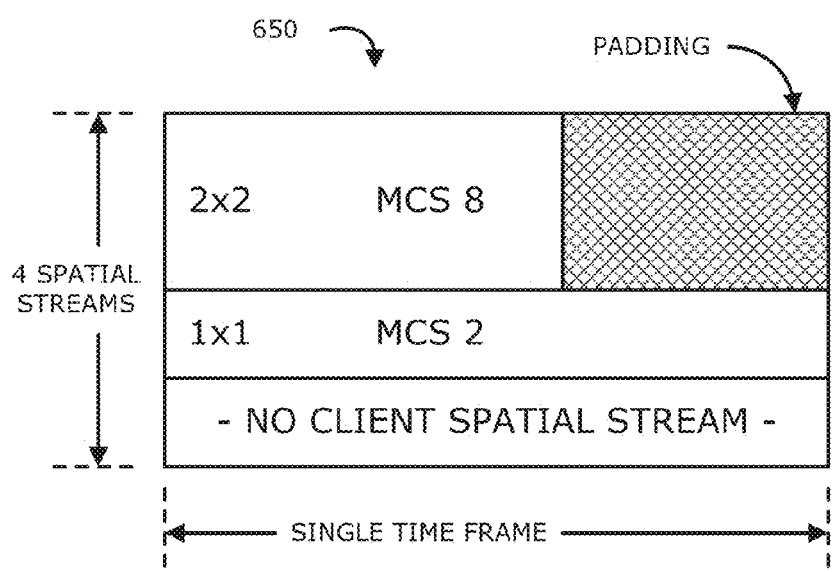
FIG. 6B is an illustrative example of a logical structure of a message (packet) transmission without use of the selective beamforming grouping scheme.

Based on the selective beamforming grouping scheme, as shown in FIG. 6A, a message 600 transmitted from the AP operating in accordance with MU-MIMO ensure complete usage of available spatial stream capacity (e.g., 4 spatial streams 610-613) with padding 620 associated with spatial streams at a higher MCS rate (e.g., MCS index 2) than the lowest MCS rate (e.g., MCS index 1) associated with the transmission. An example of a message 650 without deploying selective beamforming grouping scheme is shown in FIG. 6B.

Referring back to FIG. 5B, when S_CLT is less than S_AP, the device selection scheme determines if the current analysis is directed to a last ($N^{th}$) group with the highest MCS rate level (operation 540). If not, namely the current analysis is being conducted on client devices that are part of a group directed to a lower MCS rate level than the group directed to the highest MCS rate level, the remaining client devices in the current group are added to a next group (operation 545). Thereafter, the device selection scheme returns to analyze the spatial stream capacity of the client devices for the next group and the spatial stream capacity of the AP (operation 550).

If the current analysis is directed to the last ($N^{th}$)) group with the highest MCS rate level, the client devices are sorted in the group based on one or more parameters (operations 540 and 555). As before, these parameters may include spatial stream capacity for a client, MCS rate for a client device, or the like. Thereafter, a subset of the client devices within the selected last ($N^{th}$) group are selected, where beamforming of the client devices may improve in efforts to optimize the overall system throughout (operation 560). The selection of the subset of client devices may be conducted based on combinatorial optimization scheme, as described above.

Upon determining the subset of client devices, the AP applies transmit beamforming simultaneously (or at least concurrently) to the subset of client devices, and thereafter, removes the subset of client devices from the last group (operations 565 and 570). The device selection scheme is iterative, and continues until the AP has conducted beamforming on the last subset of client devices (operation 575).

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A computerized method for optimizing throughput for a wireless network, the method comprising:
    aggregating information associated with a plurality of client devices with beamforming capabilities in a coverage area of a network device that is configured to operate within the wireless network;
    grouping the plurality of client devices into a plurality of groups based on at least a first parameter;
    iteratively selecting a subset of client devices within a first group such that a first total number of spatial streams of the subset of client devices is at least equal to a second total number of spatial streams supported by the network device;
    in response to the first total number of spatial streams of the subset of client devices being less than the second total number of spatial streams supported by the network device, adding the subset of client devices to a second and different group; and
    applying transmit beamforming concurrently for each client device of the subset of client devices.

2. The computerized method of claim 1, wherein the aggregating of the information comprises obtaining one or more identifiers associated with each of the plurality of client devices.

3. The computerized method of claim 1, wherein grouping the plurality of client devices occurs in response to a determination that each of plurality of client devices supports multi-user, multiple-input and multiple-output (MU-MIMO) communications.

4. The computerized method of claim 1, wherein grouping the plurality of client devices into the plurality of groups comprises assigning each client device of the plurality of client devices to a particular group of the one or more groups based on a data transfer rate level for the client device, the data transfer rate level that includes one or more modulation and coding scheme (MCS) rates being the first parameter.

5. The computerized method of claim 1, wherein grouping the plurality of client devices into the plurality of groups comprises assigning each client device of the plurality of client devices to a particular group of the one or more groups based on a signal-to-noise ratio for the client device, the signal-to-noise ratio being the first parameter.

6. The computerized method of claim 1, wherein responsive to determining that the first total number of spatial streams collectively supported by the first group of client devices is greater than or equal to the second total number of spatial streams supported by the network device, selecting the subset of client devices further comprises selecting a first subset of client devices based on an analysis of characteristics of each client device of the first group of client devices and a determination that the first subset of client devices provides optimal network throughput and collectively occupies an entire spatial stream capacity supported by the network device.

7. The computerized method of claim 1, wherein after applying the transmit beamforming, the method further comprising:
    removing information associated with the first subset of client devices from the first group of client devices.

8. The computerized method of claim 7, after removing the first subset of client devices from the first group of client devices, the method further comprises iteratively determining whether a total number of spatial streams collectively supported by remaining client devices of the first group of client devices is greater than or equal to the second total number of spatial streams supported by the network device, and if so, repeating an analysis of characteristics of each of the first group of client devices and determining that a subsequent subset of client devices provides optimal network throughput and collectively occupies the entire spatial stream capacity supported by the network device.

9. The computerized method of claim 8, wherein responsive to determining that the total number of spatial streams collectively supported by the remaining client devices of the first group of client devices is less than the second total number of spatial streams supported by the network device, adding the remaining client devices to a second group of the one or more groups, provided the one or more groups include at least three groups.

10. A network device comprising: a plurality of antenna elements; one or more hardware processors; and a memory communicatively coupled to the one or more hardware processors, the memory comprises selective beamforming grouping logic that, upon execution by the one or more processors, (i) aggregates information associated with a plurality of client devices with beamforming capabilities within a coverage area of the network device, (ii) groups the plurality of client devices into a plurality of groups based on a data transfer rate level supported by each of the plurality of client devices, (iii) iteratively selects a subset of client devices within a first group such that a first total number of spatial streams of the subset of client devices is at least equal to a second total number of spatial streams supported by the network device, (iv) adds the subset of client devices to a second and different group in response to the first total number of spatial streams of the subset of client devices being less than the second total number of spatial streams supported by the network device, and (v) applies transmit beamforming concurrently for each client device of the subset of client devices.

11. The network device of claim 10, wherein the information associated with the plurality of client devices that is aggregated by the selective beamforming grouping logic comprises one or more identifiers each associated with one of the plurality of client devices.

12. The network device of claim 10, wherein the processor executes the selective beamforming grouping logic in response to a triggering event.

13. The network device of claim 12, wherein the triggering event comprises a change in association by the network device with at least one client device.

14. The network device of claim 13, wherein the triggering event comprises an expiration of a predetermined amount of time without the change in association.

15. The network device of claim 10, wherein responsive to determining that the first total number of spatial streams collectively supported by the first group of client devices is greater than or equal to the second total number of spatial streams supported by the network device, the selective beamforming grouping logic further selects a first subset of client devices as the subset of client devices based on an analysis of one or more characteristics of each of the first group of client devices and a determination that the first subset of client devices provides optimal network throughput and collectively occupies an entire spatial stream capacity supported by the network device.

16. The network device of claim 10, wherein the memory further comprises transmit beamforming control logic that, when executed by the processor, controls transmit beamforming through the plurality of antenna elements to the subset of client devices.

17. A non-transitory storage medium implemented within a network device and including selective beamforming grouping logic that, when executed by one or more hardware processors of the network device, performs operations comprising:
- aggregating information associated with a plurality of client devices with beamforming capabilities;
- grouping the plurality of client devices into a plurality of groups based on at least a first parameter;
- iteratively selecting a subset of client devices within a first group such that a first total number of spatial streams of the subset of client devices is at least equal to a second total number of spatial streams supported by the network device;
- in response to the first total number of spatial streams of the subset of client devices being less than the second total number of spatial streams supported by the network device, adding the subset of client devices to a second and different group; and
- applying transmit beamforming concurrently for each client device of the subset of client devices.

18. The non-transitory storage medium of claim 17, wherein grouping the plurality of client devices into a plurality of groups comprises assigning each client device of the plurality of client devices to a particular group of the one or more groups based on a data transfer rate level for the client device, the data transfer rate level that includes one or more modulation and coding scheme (MCS) rates being the first parameter.

* * * * *